United States Patent Office 3,754,078
Patented Aug. 21, 1973

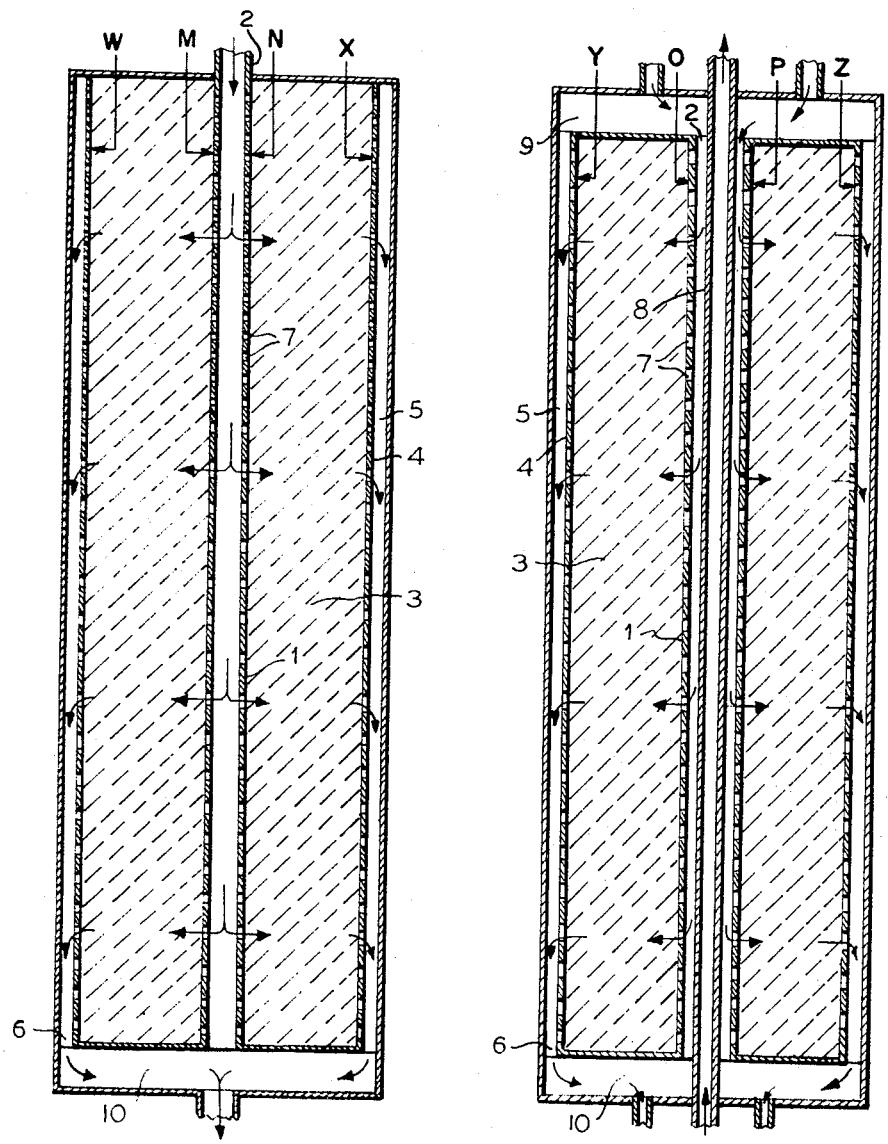

3,754,078
METHOD FOR OBTAINING UNIFORM DISTRIBUTION OF GAS FLOW THROUGH CATALYST BEDS
Helmut Hinrichs, Leonding, near Linz (Danube), Heinz Lehner, Anton Wagner, Josef Pesl, Johann Niedetzky, and Franz Faschinger, Linz (Danube), Austria, assignors to Osterreichische Stickstoffwerke Aktiengesellschaft, Linz (Danube), Austria
Filed Apr. 20, 1971, Ser. No. 135,639
Claims priority, application Austria, Apr. 21, 1970, A 3,596/70
Int. Cl. C01c 1/04; B01j 9/00
U.S. Cl. 423—359
6 Claims

ABSTRACT OF THE DISCLOSURE

Uniform distribution of gas is achieved in catalyst beds in which the flow is radial in reactors for catalytic exothermic high pressures syntheses by gradation of the free surface exposed to flow and serving for the passage of gas into or out of the catalyst layer so that it is 10 to 25 times greater at the first quarter of the catalyst layer than is the free area exposed to flow at the remaining part of the catalyst layer.

---

This invention relates to a process for achieving a uniform distribution of gas in catalyst beds or layers in which the flow is radial. The invention is particulaly concerned with the attainment of uniform gas distribution in the catalyst layers of reactors for carrying out catalytic, exothermic high pressure syntheses, for example the synthesis of ammonia. According to recent proposals, the flow of synthesis gas in catalyst beds or layers in reactors for catalytic, exothermic high pressure syntheses, especially the synthesis of ammonia, may be in a radial direction instead of a hitherto customary axial direction. The advantage of this direction of flow is considered to be a lower loss of pressure in the reactor, this being an advantage which should above all manifest itself in large installations.

At the same time there is the possibility of choosing only a radial direction of flow in such a reactor. This direction may be either outwards or inwards, and at the same time the use of a pre-reduced catalyst is recommended to avoid damage to the catalyst through non-uniform flow during the reduction, such as is alleged to occur if the gas flow is radial (see German published specification No. 1,256,205).

It has furthermore been proposed in the case of reactors for exothermic catalytic high pressure syntheses in which the catalyst is arranged in several layers, between each of which cooling takes place, that the radial direction of gas flow should be employed only in the last particularly long end layer, of catalyst (Austrian Pat. No. 281,870), in which case an outward direction of flow of the gas is exclusively chosen. In this case a pre-reduced catalyst need not be used, since the reduction of the catalyst, which as a result of the greater exposure to gas occurs earlier in the regions near the centre than in the regions near the edge, progresses in the direction of gas flow, so that damage to a catalyst which has already been reduced does not have to be feared.

It is also known that a non-uniform gas flow in catalyst layers, which manifest itself particularly in catalyst layers where the flow is radial and is based on so-called channel formation in the catalyst layer, may be prevented if at least one of the walls which limit the catalyst bed and through which the gas flows, consist of two surfaces separated by a gas-filled interspace, which are both provided with orifices, and if these orifices are of such size that when the reaction gas flows through the reactor a pressure drop occurs at these wall surfaces which is at least 0.1 times, but preferably 1.0 to 2.0 times, the pressure drop in the catalyst bed (Austrian Pat. No. 273,054). As a result of this relatively high additional pressure drop, the advantage of catalyst layers in which the flow is radial is however in part lost again, since the radial flow is above all chosen with a view to the lower pressure loss.

In catalyst layers wherein the flow is radial and an outward diretction of flow is maintained, the gas enters the layer through a centrally arranged tube with gas-permeable walls, the so-called central tube, which is kept as narrow as possible in view of the expensive high pressure space. Therefore, in most cases, it will have a peripheral surface area which is many times its cross-sectional area. The end of this tube opposite to the gas inlet is closed in a gas-tight manner. After passing through the catalyst layer, the gas leaves through a gas-permeable wall of the catalyst bed which is concentric to the central tube, and is conducted away through an annular gap between this wall and the peripheral surface of the furnace insert, and for constructional reasons in most cases it is conducted away in a direction opposite to that of the gas entry into the central tube.

With catalyst layers arranged in this way, in which the flow is radial, it was found that, apart from possible channel formation, an irregular distribution of gas flow through the catalyst layer inherently occurs, and, surprisingly, the greatest flow density is to be found above all in those parts of the catalyst layer which are furthest removed from the gas inlet, whilst only very little gas flows through the catalyst layer in the parts of the catalyst layer which are nearest to the gas inlet. The consequence of this non-uniform flow is poor utilisation of the catalyst and hence of the high pressure space, and this additionally leads to the catalyst being spent earlier in the parts where there is intense flow than in the parts where there is weak flow. Finally, the duration of reduction of the catalyst in the furnace, which inherently is possible without damaging the catalyst, is also disproportionately lengthened, since the catalyst is reduced only very slowly in the parts of the layer where there is weak flow.

It has now been found that a completely uniform gas flow in all parts of catalyst layers wherein the flow is radially outwards is possible if the free surface which serves for passage of gas is so graded that this is far greater in the parts of the catalyst layer which are nearest to the gas inlet than it is in the remaining parts of the catalyst layer.

Accordingly the present invention provides a process for achieving a uniform distribution of gas in catalyst layers in which the flow is radial, in a reactor for carrying out catalytic, exothermic high pressure syntheses, preferably for the synthesis of ammonia, in which the said catalyst layers are charged with gas from a central tube provided with a gas-permeable wall and closed in a gas-tight manner on the side opposite the side at which the gas enters, and the gas, after passing through a catalyst layer and passing through a gas-permeable wall surrounding the layer is conducted away through an annular gap surrounding the wall, in a direction away from the gas entry, which the wall, in a direction away from the gas entry, which process comprises grading the free surface exposed to flow, and serving for the passage of gas into the catalyst layer or out of the catalyst layer, so that it is, 10 to 25 times greater per sq. cm. at the level of the first quarter of the catalyst layer, calculated from the side of the gas entry into the central tube, than is the free area exposed to flow, per sq. cm., at the level of the remaining part of the catalyst layer.

It is advisable that the second quarter of the catalyst layer, adjoining the first quarter, should also be provided with a greater surface exposed to flow, in order to balance any tendency still present at this position for lesser flow through the catalyst bed. Appropriately, the free surface per unit surface area serving for the passage of gas should, in this second quarter of the height of the catalyst layer, be about ⅛ to ¹⁄₁₀ of the free surface per unit surface area in the first quarter, and this magnitude can be maintained uniformly over the entire quarter. It is particularly advantageous, however, to allow the surface within this quarter to decrease progressively in the direction of gas flow, so that the value of ⅛ to ¹⁄₁₀ of the free surface of the first quarter represents an average value.

In the third and fourth quarter of the catalyst layer the free surface area per unit surface area is appropriately so chosen that it is approximately uniformly ¹⁄₁₅ to ¹⁄₂₀ of the free surface per unit surface area in the first quarter.

The limitation of the free surface serving for exposure to flow is best achieved by an appropriate gradation of the orifices either in the gas-permeable wall of the central tube or of the gas-permeable wall which represents the outer perimeter of the catalyst bed. It is also achievable by appropriate variation of the particle size of the catalyst in the upper and lower parts of the catalyst layer, particularly if the catalyst layers are of large cross-section.

It is assumed that the non-uniform gas flow is caused by slowness of the gas in changing its direction of flow, but other factors, such as back-pressure from below in the central tube and above in the annular gap probably also play a role. These also depend on the dimensions of the central tube and annular gap and their ratio to one another, or the ratio of both to the dimensions of the catalyst bed, so that an accurate gradation of the free surface exposed to flow must be determined in each case. The gradation definitely need not decrease continually in the direction of gas flow; it is equally possible that an additional correction through a narrowly limited increase or decrease of the free surface exposed to flow, within the limits according to the invention, may be necessary in one part or another. Thus, for example, a zone of particularly low free surface exposed to flow is at times required at about half the height of the catalyst layer.

The uniformity of gas flow can be tested without difficulty by zonal measurement of the temperature in the peripheral edge zones of the catalyst layer.

In a catalyst layer wherein the flow is radial, it is customary to keep the uppermost part of the layer at rest to avoid gas short-circuits if the catalyst should settle, this, for example, being achieved by sheet-metal rings dipping into the catalyst layer. In this case, the gradation according to the invention must start only at the end of the zone which is kept at rest.

The present invention further provides a device which is particularly suitable for carrying out the process according to the invention, which device comprises a catalyst layer arranged between two concentric, gas-permeable sheet-metal rings and a bottom and lid which close these off, the space contained within the inner sheet-metal ring being provided on one side with a gas inlet orifice and being closed in a gas-tight manner at the other end, and an outer sheet-metal ring, together with the peripheral surface of the furnace insert which encloses the catalyst layer, forming an annular gap which is provided on the side opposite the gas inlet orifice with a gas outlet orifice, wherein the inner of the concentric sheet-metal rings is provided with uniformly distributed round, angular, slit-shaped or similar orifices which per orifice have a surface area of less than 1 sq. cm., the surface area of these orifices, per sq. cm., being, in the uppermost quarter of the total surface area of the inner sheet-metal ring, 10 to 25 times the surface area of the orifices, per sq. cm., which are located in the remaining three quarters of the total surface area of the inner sheet-metal ring, and wherein the orifices are uniformly distributed in the outer of the concentric sheet-metal rings and their surface area, per sq. cm., is at least as great as the surface area of the orifices, per sq. cm., in the first quarter of the inner sheet-metal ring. This last requirement must be observed, since otherwise the outer sheet-metal ring would in part make the gradation of the surfaces in the inner sheet-metal ring ineffective.

In the second quarter of this sheet-metal ring, the surface area of the orifices is preferably ⅛ to ¹⁄₁₀, and in the 3rd and 4th quarter ¹⁄₁₅ to ¹⁄₂₀, of the surface area of the orifices of the first quarter. The individual orifices should inherently be kept as small as possible and in the regions of large free surfaces per unit surface area these large surfaces should preferably be achieved through numerous small orifices. A small number of large orifices have the disadvantage of non-uniform distribution of gas. To avoid catalyst granules slipping through the orifices, it is advisable to introduce fine wire gauze, which offers negligible resistance to gas, between the two sheet-metal rings and the catalyst bed.

Such a device is schematically illustrated in its basic construction in FIG. 1 of the accompanying drawing.

The device illustrated in FIG. 1 comprises an inner concentric sheet-metal ring 1, a gas inlet orifice 2, a catalyst layer 3, an outer sheet-metal ring 4, annular gap 5, a gas outlet orifice 6 which is provided in the base of the catalyst housing, and orifices 7 in the inner, concentric sheet-metal ring.

FIG. 2 of the accompanying drawing serves to illustrate the use of a device according to the invention as an end catalyst layer in an ammonia synthesis reactor divided into several catalyst layers, in which reactor cooling is effected between the catalyst layers by indirect heat exchange with fresh synthesis gas.

In FIG. 2, the reference numbers 1 to 7 have the same meaning as in FIG. 1. The device illustrated in FIG. 2 also includes a central ascending tube 8, passing through the entire furnace, which conducts fresh synthesis gas coming from the main heat exchanger (which is located below the device according to the invention, in the base of the furnace) as far as the upper end of the furnace, from where it flows downwards through the initial catalyst layers, before it enters the final catalyst layer constructed according to the invention. The reacting synthesis gas, which leaves the tubes of the diaphragm heat exchanger, which is not shown in FIG. 2, first accumulates in an annular space 9 around the ascending tube 8, before it enters, at 2, the space within the inner concentric sheet-metal ring 1, which serves as a gas distributor and is in the present case constructed as an annular space. The gas leaving the annular gap 5 at 6 collects in an annular space 10 before it is passed into the main heat exchanger.

If it is desired to keep the uppermost part of the catalyst layer at rest, this can be acheived simply by the uppermost part of the inner sheet-metal ring 1, and in particular, preferably about ⅛, having no offices at all and then adjoining an arrangement of orifices in accordance with the present invention. In order to make it possible to vary the distribution of the orifices 7 within the limits according to the invention in the inner concentric sheet-metal ring 1, for example, in order to take into account changes occurring during operation, such as changes in the catalyst particle size, catalyst activity or gas to which the reactor is subjected, without having to dismantle the entire reactor, it has proved particularly advantageous to contruct the sheet-metal ring 1 to be double-walled. Whilst the outer of the two tubular walls is uniformly provided with orifices and is permanently welded to the baffle plates which represent the lid and bottom of the catalyst layer, the inner of the two tubular walls is only pushed into the outer tube, so that it can be replaced at any time. It is provided, according to the invention, with the orifices 7 of graded surface area. The free surface of the orifices of the outer one of the tubular walls must naturally be chosen to be so great that, per unit surface area, it is greater than the surface of the orifices 7 in the uppermost quarter of the inner tube, so that the graded orifices according to the invention come fully into effect.

The present invention further provides a device which is constructed in the same way as that shown in FIG. 1, with the sole difference that the orifices arranged in accordance with the invention are located in the outer sheet-metal ring, whilst the inner concentric sheet-metal ring possesses orifices to an extent such that their free surface per unit surface area is at least as great as that in the uppermost quarter, viewed in the direction of gas flow, of the outer sheet-metal ring. Preferably, the magnitude of the free surfaces in the individual quarters will be chosen to be the same as in the case of the device with gradation of the free outflow surface in the inner sheet-metal ring.

As a result of the uniform gas flow achieved with the process according to the invention optimum utilisation of the catalyst in catalyst layers in which the flow is radial is possible, and this does not have to be obtained at the expense of a significant loss of pressure in the walls which surround the catalyst layer. Since, as a result of the slight total pressure loss which occurs, it is possible to use a catalyst of relatively small particle size, for example a catalyst having particles of 1 to 3 mm. in diameter, in such layers, a particularly good synthesis of ammonia is achievable with furnaces in which such a catalyst layer constructed according to the invention is incorporated, for example as the final catalyst layer. The following example illustrates the invention.

EXAMPLE

In a device for the synthesis of ammonia, consisting of three catalyst layers with cooling by heat exchange with fresh synthesis gas between these layers, the third catalyst layer is constructed as illustrated in FIG. 2. The high pressure vessel has an internal diameter of 800 mm. and the third catalyst bed has a height of 4650 mm., an external diameter of 660 mm., an internal diameter of 300 mm. and a catalyst volume of 1.27 mm.$^3$. The catalysts used is made from a mixture of iron oxide approximately corresponding to magnetite ($Fe_3O_4$) with 0.5% by weight of potassium oxide, 2.8–3% by weight of aluminium oxide, 3.2–3.4% by weight of calcium oxide and 1% by weight of magnesium oxide as additives by reducing with a mixture of hydrogen and nitrogen. The average particle size of the catalyst in the third catalyst layer is 2.5 mm. The inner, gas-permeable wall 1 is provided with orifices of the following gradation.

| mm. Height from below | mm.$^2$ Orifice surface/cm.$^2$ | |
|---|---|---|
| 4,650–4,492 | 0 | |
| 4,492–3,392 | 41 | 1st quarter |
| 3,392–3,369 | 8.5 | 39.3 mm.$^2$/cm.$^2$ |
| 3,369–2,992 | 8.5 | |
| 2,992–2,602 | 4.2 | 2nd quarter |
| 2,602–2,442 | 3.6 | 4.8 mm.$^2$/cm.$^2$ |
| 2,442–2,246 | 2.0 | |
| 2,246–1,972 | 2.0 | |
| 1,972–1,422 | 1.8 | 3rd quarter |
| 1,422–1,123 | 2.6 | 1.75 mm.$^2$/cm.$^2$ |
| 1,123–1,102 | 2.6 | |
| 1,102–709 | 1.5 | |
| 709–472 | 1.2 | 4th quarter |
| 472–0 | 3.1 | |

If the amount of gas introduced into the furnace is 55,000 Nm.$^3$/hour, the amount of gas introduced into the third catalyst layer is 50,000 Nm.$^3$/hour. Before the third catalyst layer, the synthesis gas contains 12.1% by volume of ammonia and 9.0% by volume of inert gas, and the pressure is 300 atmospheres. The temperature at which the gas enters is 429° C. and the temperature at which it leaves, measured in each quarter of the catalyst layer, is uniformly about 534° C. At the end of this catalyst layer, the gas contained 19.1% by volume of ammonia.

What we claim is:

1. In a process for obtaining uniform distribution of gas having a radial direction of flow through a catalyst layer in a reactor for carrying out catalytic high pressure syntheses of ammonia, wherein the catalyst layer is charged with gas from a central tube provided with a gas-permeable wall and closed in a gas-tight manner on the side opposite the side at which the gas enters, and the gas, after passing through the catalyst layer and then through a gas-permeable wall surrounding the catalyst layer, is conducted away through an annular gap surrounding the wall in a direction away from the gas entry, the improvement which comprises passing the gas into or out of the catalyst layer through the wall having a graded free surface such that the total area of the free surface is 10 to 25 times greater per sq. cm. of wall area in the first quarter of the catalyst layer, determined from the point of entry of the gas into the central tube, than is the total area of the free surface, per sq. cm. of wall area, in the remaining part of the catalyst layer.

2. The improvement according to claim 1, in which the gradation of the free surface is achieved by appropriate gradation of the free surface of the peripheral surface of the central tube which serves for the entry of the gas into the catalyst layer.

3. The improvement according to claim 1, in which the gradation of the free surface is achieved by appropriate gradation of the free surface, serving for the outlet of gas from the catalyst layer, of the gas-permeable wall which surrounds the catalyst layer.

4. The improvement according to claim 1, in which the uppermost part of the catalyst layer is kept at rest to avoid gas short-circuits if the catalyst settles and the gradation of the free surface starts below the part of the catalyst layer which is kept at rest.

5. The improvement according to claim 1, in which the total area of the free surface per sq. cm. in the second quarter of the catalyst layer is an average of ⅛ to ¹⁄₁₀ of the total area of the free surface in the first quarter, the area of the free surface per sq. cm. in the second quarter being uniformly distributed or distributed in a manner decreasing in the direction of the gas flow in the central tube.

6. The improvement according to claim 1, in which the total area of the free surface in each of the third and fourth quarters is ¹⁄₁₅ to ¹⁄₂₀ of the total area of the free surface per sq. cm. in the first quarter, the area of the free surface per sq. cm. in the third and fourth quarters being approximately of uniform distribution.

References Cited

UNITED STATES PATENTS 2,910,350 10/1959 Jean _____ 23—289
1,605,647 11/1926 Claude _____ 23—289

FOREIGN PATENTS 1,256,205 12/1967 Germany _____ 23—199

OSCAR R. VERTIZ, Primary Examiner

H. S. MILLER, Assistant Examiner

U.S. Cl. X.R.

23—289; 252—477 R